No. 823,938. PATENTED JUNE 19, 1906.
M. DIXON.
WHEEL.
APPLICATION FILED JULY 29, 1905.

Witnesses
Inventor
Matthew Dixon
By his Attorney

UNITED STATES PATENT OFFICE.

MATTHEW DIXON, OF LONG ISLAND CITY, NEW YORK.

WHEEL.

No. 823,938.     Specification of Letters Patent.     Patented June 19, 1906.

Application filed July 29, 1905. Serial No. 271,733.

*To all whom it may concern:*

Be it known that I, MATTHEW DIXON, a citizen of the United States of America, residing at Long Island City, Queens county, New York, have invented certain new and useful Improvements in Wheels, of which the following is a specification, reference being had to the accompannying drawings, forming part of the same.

Figure 1:
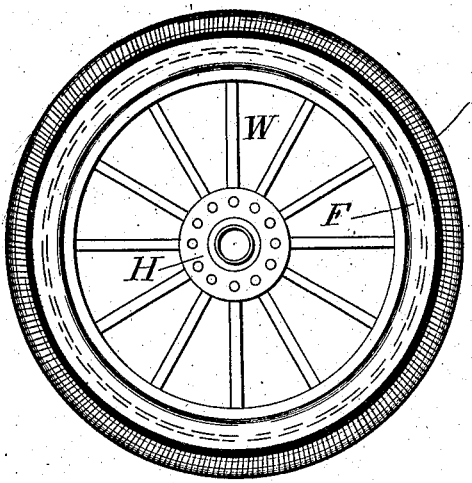
Figure 2:
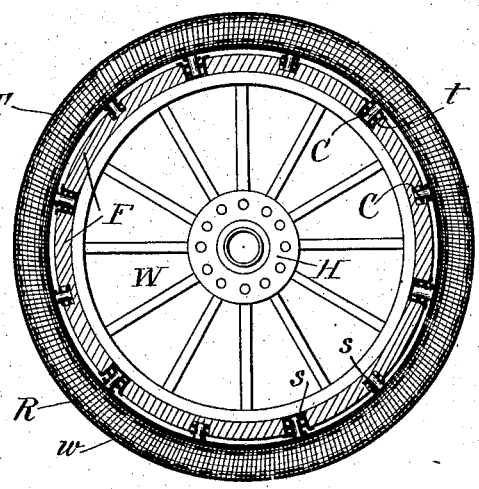
Figure 3:
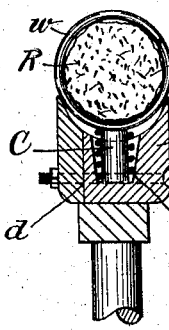
Figure 4:
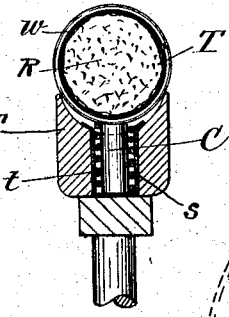
Figure 5:
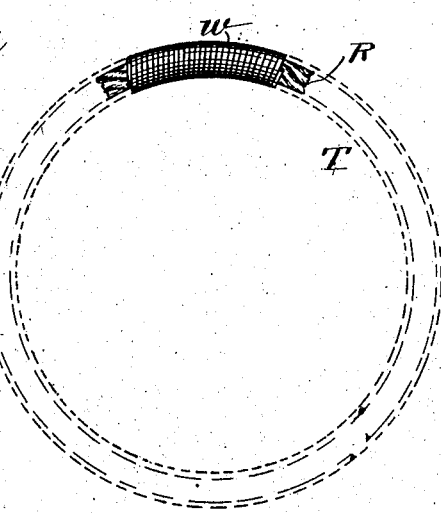
Figure 6:
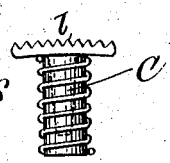

Figure 1 is a side elevation of an automobile-wheel embodying my invention. Fig. 2 a central vertical longitudinal sectional view of said wheel. Fig. 3 is a cross-sectional view of the tire, the felly, and the supporting cushion-spring, showing also a portion of the spoke. Fig. 4 is a similar view of the tire, &c., but showing a modified form of socket for the supporting-cushion. Fig. 5 is a side elevation, with portions broken away, of the tire. Fig. 6 is a side elevation of the supporting-spring and lock.

The invention relates to wheels, and particularly to wheels adapted to be used on automobiles; and it consists in a series of springs located in the felly and beneath the tire.

It also consists in a resilient but durable tire and in the combinations hereinafter described and claimed.

The peculiarities of automobile construction have occasioned a demand for peculiar wheels—wheels which in themselves constitute springs or cushions to relieve the machine, as well as the rider, of much of the jar occasioned by forcing such heavy bodies over ordinary roads, which are by no means so smooth as may be desired. Pneumatic tires have been largely used for meeting the demand thus arising, but they are liable to many objections. They are very expensive and so liable to rupture that any one about to travel any considerable distance considers it necessary to carry one or more extra tires, being quite well assured that occasion for their use will arise. Then, too, they are dangerous, since when a tire bursts, as it often does, the chaffeur very often loses control of the machine, with resulting damage of various kinds and degrees. To avoid these difficulties, I have devised the wheel herein shown and described, in which I combine a preferably resilient tire with a series of underlying springs so located and arranged as to cushion the jar and so constructed as to be both durable and economical.

In the drawings, W is the wheel, composed of a hub H, spokes S, felly F, tire T, and springs or cushions C. I do not confine myself to the exact form or dimensions shown, as almost any form of wheel may be equipped with the devices constituting it an illustration of my device.

The felly F is provided with a series of sockets *s*, some of which extend entirely through it and others of which extend only part way through. These sockets are preferably circular in cross-section and sunk vertically into the felly. They may be placed as closely together as desired. Indeed, a series of supporting-springs so closely associated as to practically make a continuous line on the peripheral face of the felly would also be within the field of my invention. In the sockets *s*, if, as shown, I seat a series of supporting-spring cushions C, preferably of solid rubber, cylindrical in form, surrounded by spiral springs of steel. They are so proportioned as to extend up above the upper edges of the sockets, and in them I locate a serrated plate *l*, locking the tire in place. In Fig. 3 these cushions are shown as being supported by an underlying portion of the felly; but in Fig. 4 there is a separate metal thimble *t* seated in the socket, its inner flanges extending over a portion of the peripheral face of the felly to hold it in place, and in this thimble the cushion is seated. Of course the sockets may all be of either variety shown or of any other variety suitable for holding the cushions.

The tire I prefer to use is a continuous spirally-wound steel wire *w*, with a core R, of rope or other material, which though sufficiently resilient to yield somewhat when pressure is applied is still so tenacious of its own form as to firmly support its inclosing wire. The felly is so grooved as to receive and hold the tire in position upon its periphery and upon or over the projecting ends of the cushions. If the tire has not sufficient elasticity to permit its being sprung on over the projecting edge of the felly, that may be made in two parts, divided, as indicated at the line *d* in Fig 3, the left-hand part or ring being held to the other part by bolts or clips. With that form the ring part of the felly can be readily removed, the tire placed, and the ring part replaced, when the tire will be thereafter firmly held in position. As a wheel thus constructed revolves upon its axle the bearing part of the tire, yielding to some extent itself, is continuously supported on two or more of the cushions, which thus take up the objectional jar and cause the supported vehicle and all its parts to ride smoothly and easily.

The various parts of such wheel are easily and economically constructed and very durable in use. They cannot explode and even when worn are not liable to cause unexpected and irremediable damage. When they do become worn, they are easily repaired or replaced. They are not noisy, but still make sufficient noise to announce their coming. They will not flatten, therefore economize power, and glass and nails cannot destroy them.

What I claim as my invention, and desire to secure by Letters Patent, is—

1. A wheel provided with a series of cushion-springs located upon the felly and surrounded by a tire composed of a spirally-wound metal wire, and a locking device, all combined, substantially as set forth; whereby the tire will be supported upon the springs and prevented from turning about the wheel.

2. A wheel provided with a series of cushion-springs located upon the felly and surrounded by a tire composed of a spirally-wound metal wire inclosing a resilient substance, and a locking device, all combined substantially as set forth; whereby the tire will be supported upon the springs and prevented from turning about the wheel.

3. A wheel provided with a series of cushion-springs located upon the felly and surrounded by a tire composed of a spirally-wound metal wire inclosing a solid but resilient substance, all substantially as set forth.

4. A wheel provided with a felly with a circumferentially-grooved face and having sockets extending inwardly from its outer face, cushion-springs composed of a rubber core and an inclosing spiral metal spring seated in said sockets and extending outward beyond the face of the felly, and a tire composed of a spirally-wound wire with a core of fiber, said tire being mounted in the groove of the felly and bearing upon the exposed end of said cushions, all substantially as set forth.

In testimony whereof I have signed my name to this specification, in the presence of two subscribing witnesses, this 22d day of July, 1905.

MATTHEW DIXON.

Witnesses:
A. G. N. VERMILYN,
H. D. BARMORE.